United States Patent [19]

Braese et al.

[11] 4,239,861

[45] Dec. 16, 1980

[54] POLYVINYL CHLORIDE-POLYCARBONATE ALLOYS

[75] Inventors: Hans-Eberhard Braese; Winfried Fischer; Dietrich Hardt, all of Cologne; Richard Prinz, Leverkusen; Volker Serini, Krefeld, all of Fed. Rep. of Germany

[73] Assignee: Bayer Aktiengesellschaft, Leverkusen, Fed. Rep. of Germany

[21] Appl. No.: 541,011

[22] Filed: Jan. 14, 1975

[30] Foreign Application Priority Data

Jan. 17, 1974 [DE] Fed. Rep. of Germany ....... 2402175

[51] Int. Cl.³ ............................................. C08L 67/06
[52] U.S. Cl. ................................... 525/151; 525/146; 525/147; 525/148
[58] Field of Search ................ 260/873; 525/146, 147, 525/148, 151

[56] References Cited

U.S. PATENT DOCUMENTS

| | | | |
|---|---|---|---|
| 3,305,605 | 2/1967 | Hostettler et al. | 260/873 |
| 3,544,514 | 12/1970 | Schnell et al. | 260/873 |
| 3,792,113 | 2/1974 | Goswami et al. | 260/873 |

*Primary Examiner*—J. Ziegler
*Attorney, Agent, or Firm*—Connolly and Hutz

[57] ABSTRACT

Polymer alloys consisting of
(a) 20–90% by weight of polyvinyl chloride or copolymers of vinyl chloride with up to 30% by weight of other copolymerizable vinyl compounds, and
(b) 10–80% by weight of aromatic polycarbonates.

9 Claims, No Drawings

POLYVINYL CHLORIDE-POLYCARBONATE ALLOYS

This invention relates to thermoplastic alloys which are dimensionally stable to heat and are obtained from vinyl chloride polymers and aromatic polycarbonates.

The freezing temperature (glass transition temperature) of polyvinyl chloride is about 80° C. so that its dimensional stability to heat (Vicat temperature about 75° to 84° C., depending on the K-value and formulation) is insufficient for many purposes. Attempts have therefore been made to improve the dimensional stability to heat by altering the molecular structure (copolymerisation) or by chemical after-treatments or by the addition of thermoplasts which have a higher glass transition temperature (G. Kühne et al., Kunststoffe Volume 63 (1973) pages 139–142). Partial successes have been achieved (Vicat temperatures about 90° C.), in particular, by rechlorination and crosslinking, as well as by copolymerisation with maleic imides. It has also been attempted to mix PVC with other thermoplasts. Technically usable products, however, have only been obtained in a few cases.

The polymer alloys according to the invention consist of:
(a) 20–90%, by weight, of polyvinyl chloride or copolymers of vinyl chloride with up to 30%, by weight, of other copolymerisable vinyl compounds; and
(b) 10–80%, by weight, of aromatic polycarbonates, preferably of:
(a) 40–80%, by weight, of polyvinyl chloride and
(b) 20–60%, by weight, of aromatic polycarbonates.

The polymer alloys according to the invention may be prepared by dissolving their polymer components in suitable solvents and evaporating off the solvents or by mutual precipitation. They may also be prepared by mixing the components mechanically by conventional methods.

Suitable polycarbonates for the purpose of the invention are homo- or co-polycarbonates and mixtures of various homo- and co-polycarbonates. The polycarbonates generally have molecular weights of from 10,000–200,000 (average molecular weight $M_w$), preferably from 20,000–80,000. They may be prepared, for example, by the diphasic interface process from phosgene and bisphenols or by other methods described in the literature (see H. Schnell, Chemistry and Physics of Polycarbonates, New York-London-Sydney, Interscience Publishers 1964, Polymer Reviews, Vol. 9 and U.S. Pat. Nos. 3,028,365; 2,999,835; 3,148,172; 3,271,368; 2,991,273; 3,271,367; 3,780,078; 3,014,891 and 2,999,846).

The units in the aromatic polycarbonates according to the invention may be based, for example, on the following bisphenols:
hydroquinone,
resorcinol,
dihydroxy diphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hyroxyphenyl)-sulphoxides,
bis-(hydroxyphenyl)-sulphones and
$\alpha,\alpha'$-bis-(hydroxyphenyl)-diisopropyl benzenes.

Among these bisphenols, the following are preferred:
2,2-bis-(4-hydroxyphenyl)-propane,
2,4-bis-(4-hydroxyphenyl)-2-methyl butane,
1,1-bis-(4-hydroxyphenyl)-cylcohexane,
$\alpha,\alpha'$-bis-(4-hydroxyphenyl)-p-diisopropyl benzene,
2,2-bis-(3,5-dichloro-4-hydroxyphenyl)-propane,
2,2-bis-(3,5-dibromo-4-hydroxyphenyl)-propane and
2,2-bis-(3-chloro-4-hydroxyphenyl)-propane.

Particularly preferred polycarbonates are the copolycarbonates based on 2,2-bis-(4-hydroxyphenyl)-propane and one of the other preferred bisphenols mentioned above as well as polycarbonate based only on 2,2-bis-(4-hydroxyphenyl)-propane.

The above-mentioned bisphenols as well as others suitable for the preparation of the aromatic polycarbonates have been described in U.S. Pat. Nos. 3,028,365; 2,999,835; 3,148,172; 3,271,368; 2,991,273; 3,271,367; 3,780,078; 3,014,891 and 2,999,846.

The polycarbonates may be branched by incorporating small quantities of polyhydroxyl compounds, e.g. 0.05–2.0 mol-% (based on the bisphenols used). Polycarbonates of this type have been described, for example, in German OS Nos. 1,570,533; 2,116,974 and 2,113,347; British PS Nos. 885,442, and 1,079,821 and U.S. Pat. No. 3,544,514. The following are examples of polyhydroxyl compounds which may be used for this purpose: 1,3,5-trihydroxybenzol, 4,6-dimethyl-2,4,6-tri-(4-hydroxyphenyl)-heptene-2; 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-(4,4'-dihydroxydiphenyl)-cyclohexyl]-propane, 2,4-bis-(4-hydroxyphenyl-4-isopropyl)-phenol, 2,6-bis-(2'-hydroxy-5'-methyl-benzyl)-4-methyl-phenol, 2,4-di-dihydroxybenzoic acid, 2-(4-hydroxyphenyl)-2-(2,4-dihydroxyphenyl)-propane and 1,4-bis-(4',4''-dihydroxytriphenyl-methyl)-benzene.

The polymer alloys according to the invention may contain vinyl chloride polymers which have been obtained by emulsion, suspension or solvent-free polymerisation and which have K-values according to Fikentscher of from 50 to 80 determined in Cyclohexanone (1% solution at 23+ C.). Polyvinyl chloride and copolymers of vinyl chloride consisting of at least 70% by weight of vinyl chloride and not more than 30% by weight of vinyl compound are suitable for this purpose. Vinyl and vinylidene compounds suitable for copolymerisation with vinyl chloride include, for example, vinylidene chloride and vinylidene fluoride, vinyl esters, such as vinyl acetate, vinyl propionate or vinyl benzoate, acrylic and methacrylic acid and the alkyl esters thereof, amides and nitriles of acrylic and methacrylic acid, maleic acid esters and semi-esters and maleic imides, vinyl ethers and olefinically unsaturated hydrocarbons, such as ethylene, propylene or butylene. Rechlorinated polyvinyl chloride is also suitable.

The aromatic polycarbonates are surprisingly compatible with polyvinyl chloride so that the polymer alloys according to the invention have excellent physical properties.

For example, the polymer alloys according to the invention have an exceptionally high heat distortion temperature which is substantially above that of polyvinyl chloride.

Vicat temperatures according to DIN 53460 (5 kp) of about 108° C. are achieved when the alloys have polycarbonate contents (polycarbonate based on 2,2-bis-(4-hydroxyphenyl)-propane of about 50%, by weight. In addition, the new products have great hardness, tensile strength and flexural strength.

The polymer alloys according to the invention are considerably more flame-resistant than pure polycarbonates and are largely resistant to acids, alkalis and solvents.

They may be obtained by mixing the polycarbonate with polyvinyl chloride with the addition of a conventional stabiliser system followed by homogenisation on mixing apparatus, such as rollers, mixing screws, extruders, internal mixers or kneaders. Owing to the operating temperatures of up to 240° C. employed, it is advisable to add the total quantity of stabiliser required to the polyvinyl chloride by vigorous mixing in a high-speed mixer (temperatures up to 150° C.) before the polyvinyl chloride is mixed with the polycarbonate, or, for example, the polyvinyl chloride may be added as a stabilised granulate to the polycarbonate which is usually in the form of a powder or granulate and the mixture may then be homogenised. Alternatively, the two polymers may be melted separately, for example in extruders, and the melts may then be combined. The polycarbonate or polyvinyl chloride may also first be melted separately, e.g. on rollers, and the second component may then be added.

The polymer alloys according to the invention may also be prepared from a solution or from emulsions of different immiscible solvents. Thus, for example, polycarbonate based on 2,2-bis-(4-hydroxyphenyl)-propane may be dissolved in $CH_2Cl_2$, while polyvinyl chloride is dissolved in cyclohexanone. The two solutions, which are not completely miscible, may be converted into an emulsion by vigorous stirring. The polycarbonate and polyvinyl chloride may be obtained together from this emulsion by the addition of a non-solvent or by introducing the emulsion dropwise into a precipitating agent or by evaporating the solvent.

The polymer alloys may be worked-up into shaped articles by conventional thermoplastic processing methods either as powders or after they have been made-up into granulates.

The polymer alloys according to the invention may be stabilised by means of the conventional polyvinyl chloride stabilisers based on lead, barium/cadmium, calcium/zinc or organic tin compounds or organic PVC stabilisers used either singly or in combination. The choice of lubricants is also determined by the requirements of PVC processing. Since the operating temperatures employed for the polymer alloys are close to the upper tolerance limits of PVC, depending on the quantity of polycarbonate used, stabilisation of the PVC is particularly important. In many cases, it will be necessary to use a higher total concentration of stabiliser than for pure PVC.

Colour pigments, fillers, glass fibres, antistatic agents, flame-retarding agents and plasticisers may be added, if desired, to obtain certain properties or achieve certain effects.

Physical or chemical blowing agents may also be added to the polymer alloys according to the imvention for the purpose of obtaining a foam structure under suitable operating conditions.

The operating temperatures employed for the pre-mixing process in high-speed mixers, i.e. for incorporating the PVC stabilizer and if required, homogenising the total mixture before it is worked-up thermoplastically, are in the region of 20° to 150° C. The subsequent working-up into a granulate or finished articles should, if possible, be carried out at temperatures of not more than about 240° C., the temperature required depending both on the viscosity of the polycarbonate and on its quantity. Although the product may be worked-up in much the same way as PVC with high K-values if it has a relatively low polycarbonate content of up to about 30%, high polycarbonate contents may be expected to require higher temperatures. Owing to the resulting thermal stress on the product, the total operating times should be kept as short as possible even if the product is perfectly well stabilised.

The polymer alloys according to the invention constitute a class of chemical materials which may be used in various fields of application, for example for the manufacture of plates, sections and tubes, in particular for the building industry, where the high heat distortion temperature is particularly important. In this field, the inclusion of the polycarbonate opens up new fields of application for PVC which were previously impracticable on account of its dimensional instability to heat. This is an advantage in view of the ready availability of polyvinyl chloride. The polymer alloys may also be used in the packaging industry in the form of bottles, containers and foils which, in contrast to PVC may now be brought into contact with the hot contents. There are numerous possible uses for injection-moulded articles of these alloys in special applications where high dimensional stability to heat is required. The high chemical resistance of the polymer alloys enables them to be used in the contruction of chemical apparatus and the construction of storage containers for chemicals and ventilating systems for corrosive waste gases. It should also be mentioned that the alloys may be applied from solution by casting, brush-coating or printing for the manufacture of coatings or foils.

EXAMPLES

A stabilised polyvinyl chloride mixture is first prepared for the production of the moulding compounds described in the Examples. This mixture is then worked-up into a homogeneous mass with the polycarbonate and other components on a rolling mill. The individual products are composed as follows:

A. Polyvinyl chloride 100 parts, by weight, of suspension polyvinyl chloride with a K-value of 68 are mixed with a stabiliser system consisting of 6 parts, by weight, of di-n-octyl-tin-dithioglycolic acid ester, 1.5 parts, by weight, of stearyl stearate, 1.0 parts, by weight, of distearyl phthalate, 0.3 parts, by weight, of montanic acid ester and 0.2 parts, by weight, of polyethylene wax at 2000 revs. per min. for 5 minutes, the temperature rising to 120° C. The mixture is then cooled to room temperature while the stirring speed is reduced (to about 500 revs. per min.)

This polyvinyl chloride mixture was found to have the following mechanical properties:

| | | |
|---|---|---|
| Ball pressure hardness DIN 53 456 | $kp/cm^2$ | 1.317 |
| notch impact strength DIN 53 453 | $cmkp/cm^2$ | |
| | RT | 2 |
| Vicat DIN 55 460 ° C. | 1 kp | 86 |
| | 5 kp | 74 |
| Bending stress DIN 53 452 | | 950 |
| Sagging mm | | 3.8 |

| -continued | | |
|---|---|---|
| Tensile strength DIN 53 455 | kp/cm² | 653 |
| Elongation DIN 53 455 % | | 4 |

B. Polycarbonate

Pulverulent polycarbonate based on 2,2-bis-(4-hydroxyphenyl)propane (Makrolon 2800, product of Bayer AG).

EXAMPLE 1

80%, by weight, of polyvinyl chloride mixture (A) and 20%, by weight, of polycarbonate (B) are mixed for 1 minute in a high-speed mixer at about 1500 revs. per min. and then homogenised on a laboratory rolling mill for a total of 5 minutes. The temperature of the rollers is 230° C. A continuous sheet is obtained. This sheet is then preheated to 210° C. in a high-pressure press for 3 minutes without pressure and the compressed for a further 5 minutes to form a plate from which test samples are produced. The mechanical data are shown in Table 1.

EXAMPLE 2

Conditions of preparation as in Example 1, but using 40%, by weight, of polycarbonate plus 60%, by weight, of PVC.

EXAMPLE 3

Conditions of preparation as in Example 1, but using 50%, by weight, of polycarbonate plus 50%, by weight, of PVC.

TABLE 1

| Example | Ball pressure hardness DIN 53 456 M Pa 30'' | Notched impact strength DIN 53 453 kJ/m² R.T. | Dimensional stability to heat Vicat DIN 53 460 ° C. | | Bending stress DIN 53 452 | |
|---|---|---|---|---|---|---|
| | | | A | B | α bF M Pa | δ B mm |
| 1 | 142.6 | 2.1 | 113 | 83 | 94.9 | 3.2 |
| 2 | 154.3 | 1.5 | 121 | 90 | 57.2 | 1.8 |
| 3 | 159.2 | 1.3 | 141 | 107 | 46.6 | 1.4 |
| PVC compound | 131.7 | 2.0 | 86 | 74 | 95.0 | 3.8 |

We claim:
1. A polymer composition comprising:
 (a) from 20 to 90% by weight of a member selected from the group consisting of (i) vinyl chloride homopolymer and (ii) a copolymer consisting of copolymerized vinyl chloride and up to 30% by weight of a monomer selected from the group consisting of vinylidene chloride; vinylidene fluoride; vinyl acetate; vinyl propionate; vinyl benzoate; acrylic acid; methacrylic acid; alkyl esters, amides and nitriles of acrylic and methacrylic acids; maleic acid esters; maleic imides; vinyl ethers; ethylene; propylene and butylene, and
 (b) from 80 to 10% by weight of at least one aromatic polycarbonate which is a polyester of carbonic acid derived from a dihydroxyl compound in which the hydroxyl groups are directly attached to one or more aromatic rings.
2. A polymer composition as claimed in claim 1 which comprises:
 (a) from 40 to 80% by weight of polyvinyl chloride homopolymer, and
 (b) from 60 to 20% by weight of at least one aromatic polycarbonate.
3. A polymer composition as claimed in claim 1 in which component (a) comprises at least one vinyl chloride copolymer containing up to 30% by weight of copolymerised vinyl acetate vinyl propionate, vinyl benzoate, acrylic or methacrylic acid esters containing from 1 to 10 carbon atoms in the alcohol moiety, maleic acid esters or semi-esters, ethylene, propylene, vinyl ethers, acrylonitrile, maleic imides or vinylidene chloride.
4. A polymer composition as claimed in claim 1 in which component (a) has a K-value of from 50 to 80.
5. A polymer composition as claimed in claim 1 in which component (b) has a molecular weight of from 10,000 to 200,000.
6. A polymer composition as claimed in claim 1 in which component (b) is based on at least one bisphenol selected from the group consisting of 2,2-bis-(4-hydroxyphenyl)-propane, 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane and 2,2-bis-(3-chloro-4-hydroxyphenyl)-propane.
7. A polymer composition as claimed in claim 1 in which component (b) is based on 2,2-bis-(4-hydroxyphenyl)-propane and one member selected from the group consisting of 2,2-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane and 2,2-bis-(3-chloro-4-hydroxyphenyl)-propane.
8. A polymer composition as claimed in claim 1 in which component (b) is based on one member selected from the group consisting of 2,2-bis-(4-hydroxyphenyl)-propane or 2,4-bis-(4-hydroxyphenyl)-2-methylbutaene and α,α'-bis-(4-hydroxyphenyl)-p-diisopropylbenzene.
9. A polymer composition as claimed in claim 1 in which component (b) has a molecular weight of from 20,000 to 80,000.

Disclaimer 4,239,861.—*Hans-Eberhard Braese; Winfried Fischer; Dietrich Hardt,* Cologne, *Richard Prinz,* Leverkusen; and *Volker Serini,* Krefeld, Germany. POLYVINYL CHLORIDE-POLYCARBONATE ALLOYS. Patent dated Dec. 16, 1980. Disclaimer filed Aug. 28, 1981, by the assignee, *Bayer Aktiengesellschaft.*

Hereby enters this disclaimer to claims 1–9, all claims of said patent.

[*Official Gazette October 20, 1981.*]